United States Patent
Suzuki et al.

(10) Patent No.: US 8,765,266 B2
(45) Date of Patent: Jul. 1, 2014

(54) WET FRICTION MEMBER AND ITS MANUFACTURING METHOD

(75) Inventors: Atsushi Suzuki, Okazaki (JP); Masataka Kawabata, Toyota (JP); Masami Hata, Toyota (JP); Shoji Toida, Nagoya (JP)

(73) Assignees: Aisin Kako Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 11 days.

(21) Appl. No.: 13/563,039

(22) Filed: Jul. 31, 2012

(65) Prior Publication Data
US 2013/0032445 A1 Feb. 7, 2013

(30) Foreign Application Priority Data
Aug. 1, 2011 (JP) ................................. 2011-168059

(51) Int. Cl.
*B32B 23/04* (2006.01)

(52) U.S. Cl.
USPC ..... 428/532; 428/536; 428/537.1; 428/537.5; 428/402; 428/323; 524/31

(58) Field of Classification Search
USPC ........... 428/532, 536, 537.1, 537.5, 402, 323; 524/31
See application file for complete search history.

(56) References Cited

U.S. PATENT DOCUMENTS

| 6,316,083 | B1 * | 11/2001 | Kawabata et al. | 428/212 |
| 7,326,742 | B2 * | 2/2008 | Kawabata et al. | 524/31 |
| 7,806,975 | B2 * | 10/2010 | Lam et al. | 106/36 |
| 8,021,744 | B2 * | 9/2011 | Lam et al. | 428/292.1 |
| 8,163,387 | B2 * | 4/2012 | Kurihara et al. | 428/403 |
| 8,431,629 | B2 * | 4/2013 | Higashijima et al. | 523/155 |

FOREIGN PATENT DOCUMENTS

| JP | 5-26049 B2 | | 4/1993 |
| JP | 09-059599 | * | 3/1997 |
| JP | 9-59599 A | | 3/1997 |
| JP | 2005-42864 A | | 2/2005 |
| JP | 2012-012528 | * | 1/2012 |
| JP | 2012-12528 A | | 1/2012 |

* cited by examiner

*Primary Examiner* — Leszek Kiliman
(74) *Attorney, Agent, or Firm* — Sughrue Mion, PLLC

(57) ABSTRACT

A wet friction member contains a pulverized cork heated to 150-200° C. if necessary. The pulverized cork is mixed with other papermaking materials and formed into a paper-made substrate. The paper-made substrate is impregnated with a synthetic resin to be a binder and heated and cured. The cork itself has a high friction coefficient μ. Moreover, a powder thereof increases surface area and area in contact with a separator plate of a counter member, thereby improving a friction coefficient of a friction surface of the wet friction member. The friction coefficient of the cork itself and capacities for absorbing and discharging oil are improved by heating the cork. Thus, there is provided a wet friction member that has a higher friction coefficient μ. An increase in the friction coefficient μ, weight reduction by reducing the number of friction members, and high efficiency are achieved when used as a wet friction member.

6 Claims, 1 Drawing Sheet

F I G. 1 A
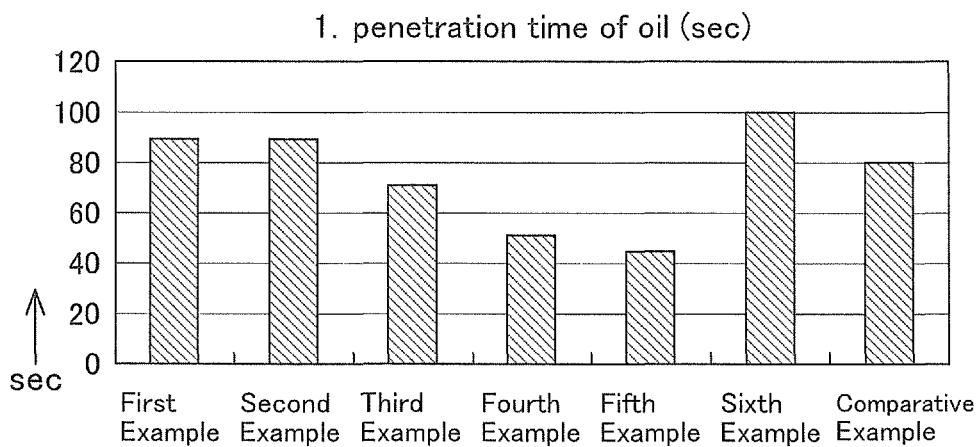
F I G. 1 B
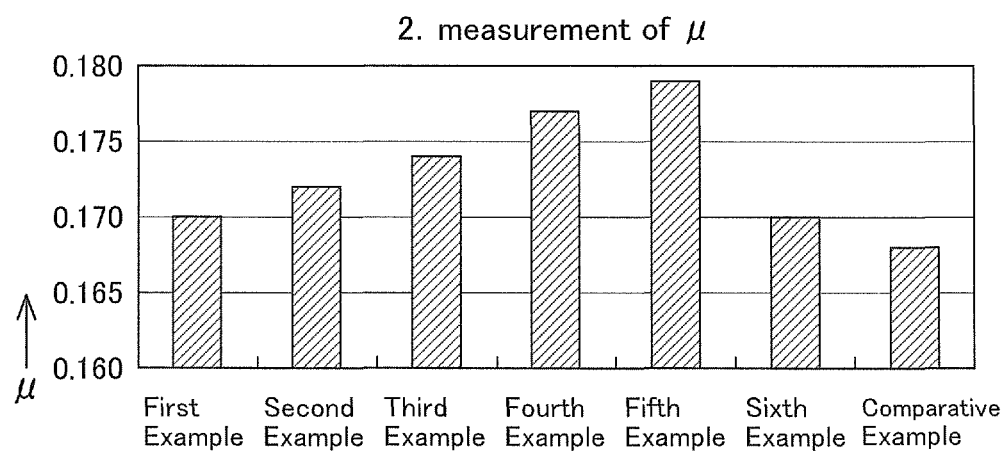

WET FRICTION MEMBER AND ITS MANUFACTURING METHOD

BACKGROUND OF THE INVENTION

1. Field of the Invention

This invention relates to a wet friction member such as a wet clutch and a lock up friction member that generates a torque by applying a high pressure to an opposite surface of a separator plate from the wet friction member, while being immersed in oil, and a method for manufacturing the same wet friction member.

2. Description of the Related Art

A wet friction member has a basic structure composed of a combination of a plurality of wet friction plates having wet friction members fixed on respective steel plates and a plurality of separator plates as counterpart members. Each of the wet friction members is made by blending organic fibers with synthetic resin and friction conditioner or modifier (organic component and/or inorganic component) and the like and thermally hardening or curing it. The separator plate is engaged with a friction surface of the wet friction member. The wet friction plates and the separator plates are engaged with each other in a lubricating oil or an automatic transmission oil (ATF) to transmit power, while they are disengaged with each other to release or cut off the power.

As an example, Japanese Patent Laid-Open Publication No. 2005-42864 discloses a wet friction member. In the invention described in the Japanese Laid-Open Publication, the wet friction member comprises a bottom part to be a base of the wet friction member and an upper part on a side in contact with a separator plate of a counter member, wherein the bottom part and the upper part have a high hardness and a low hardness, respectively. The wet friction member has a friction surface in contact with the counter member. It is written in the publication that the friction surface of the wet friction member is soft and fits well with the counter member. Moreover, it is written in the publication that an oil film formed between the wet friction member and the separator plate of the counter member can be reduced and that the wet friction member sufficiently exhibits proper characteristics or properties originated from various components blended in the wet friction member.

Moreover, according to the publication, since the wet friction member as a whole has the bottom part as the base being hard, it is prevented from being soft and from causing runout or slippage. The whole friction member firmly presses the separator plate of the counter member to reduce the oil film between the friction member and the separator plate. Thus, the wet friction member exhibits original characteristics and properties and has a high friction coefficient $\mu$ and an improved positive $\mu$-V gradient.

As described above, a wet clutch, a brake friction member, a lock up friction member or the like is connected or disconnected with a counter plate by applying a high pressure from the friction surface of the wet friction member to the facing or opposite surface of the counter plate, while being immersed in the ATF. When such a wet friction member is engaged to generate a torque, the ATF is present on the friction interface of the wet friction member. At this time, the ATF has a role of absorbing heat generated by friction. On the other hand, it is a current situation that the presence of the ATF causes a lower friction coefficient $\mu$.

However, as needs of automobile manufacturers and consumers, there is high demand for reduction in fuel consumption based on weight reduction. It is also an inevitable requirement for the wet friction members to reduce the number of the members. Then, it is required for the wet friction member to reduce its weight and to have high efficiency. In order to satisfy such a requirement, the friction coefficient $\mu$ should be increased during engagement. In principle, a material having a higher friction coefficient $\mu$ should be added to increase the friction coefficient $\mu$ of the wet friction member.

An existing common wet friction member is composed of base fibers such as pulp and/or aramid fibers and a filler such as a friction conditioner and an extender pigment. The base fibers and the filler are formed into a paper-made substrate by a paper making method. The paper-made substrate is impregnated with a phenolic resin which is a thermosetting resin and heated and cured. The wet friction member has a thickness of 1 mm and a hardness of approximately 50 in Rockwell hardness measured based on JIS (Japanese Industrial Standard) S-7726. In addition, an amount of deformation is approximately 150 μm.

A friction test was performed on the wet friction member. In detail, there were various differences in the materials. However, very few of them exhibited a friction coefficient $\mu$ the exceeded a value close to, but not exactly equal to, 0.150 to 0.160.

BRIEF SUMMARY OF THE INVENTION

The present invention has been achieved in view of the above-described social needs. It is an object of the present invention to provide a wet friction member that has a higher friction coefficient and a method for producing the same wet friction material.

According to a first aspect of the invention, there is provided a wet friction member comprising a paper-made substrate (paper material body obtained by a paper making method) that is impregnated with a synthetic resin to be a binder and then heated and cured or hardened. In the wet friction member, the paper-made substrate is formed (in a paper making method) by mixing pulverized cork (i.e. cork powders or fine cork particles).

Throughout the description of the invention, the term or wording "paper-made substrate" is used as a term that means a base or a substrate made from a paper-making material by a paper-making method. Typically, the paper-making material is a raw material containing fibers or a fibrous material as a main component and necessary additives including a filler. The paper-made substrate of the wet friction member of the invention is made from a paper-making material that contains a base fiber material (base fibrous material) and a filler. The base fiber material includes fibers or fibrous material such as a pulp or synthetic fibers (regardless of they are natural fibers or synthetic fibers or their mixture). The filler may include a filler material used conventionally to make a paper or a paper-like substance. Particularly, the paper-made substrate of the wet friction member of the invention essentially contains the cork powders as the filler. Specifically, the cork powders constitute a friction modifier or a friction conditioner as one component of the filler to be added to or mixed with the base fibers. The cork powders are mixed or blended into the paper making material and form part of the paper-made substrate of the invention after paper-making.

Moreover, throughout the description of the invention, the term "filler" is used as a term that means (in a broader meaning) a substance or a component to be added to or mixed with the base fibers. Thus, the "filler" includes a friction modifier or a friction conditioner, which essentially includes at least the cork powders, and an extender pigment, which is optionally added to or mixed in the paper making material.

The paper-made substrate obtained by paper making is thereafter impregnated with a thermosetting resin as a binder and then heated. Thus, the thermosetting resin contained in the paper-made substrate is cured and thermoset to bind the base fibers and the filler constituting the paper-made substrate, thereby providing the wet friction member of the invention.

Here, pulverization or powderization of the cork is an action or treatment or step for making surface area of the cork become larger. Experiments by the inventors show that it is desirable to use a cork having a particle diameter (as median diameter) within a range of 3 μm to 200 μm.

With the wet friction member, the cork itself has a high friction coefficient μ and an appropriate flexibility or softness. Accordingly, the flexibility improves adhesion of the paper-made substrate to a counter member. The pulverization of the cork increases the surface area of the corks occupying a friction surface of the wet friction member. Then, the friction coefficient of the friction surface of the wet friction member can be enlarged. Thus, the wet friction member according to the invention is able to decrease the weight by reducing the number of friction members and to achieve high efficiency.

As a result, the inventive wet friction member is capable of satisfying the demand for reduction in fuel consumption based on weight saving and capable of the requirement of reduction in the number of the wet friction members in response to social needs such as the needs of automobile manufacturers and customers.

According to a second aspect of the invention, there is provided a wet friction member having additional features to the first aspect of the invention. That is, in the second aspect of the invention, the pulverized cork powders or particles are subjected to a heat treatment for improving a discharge capacity of an oil film between a surface of the wet friction member and a separator plate.

Then, water or the like in the cork is volatilized by heating a surface of the cork subjected to the pulverization. Consequently, a capacity of the wet friction member for absorbing and discharging oil is further improved. Thereby, the discharge capacity of the oil film between the surface of the wet friction member and the separator plate is improved. Thus, further effects are obtained by heating the pulverized cork, in addition to the effects of the first aspect of the invention.

According to a third aspect of the invention, there is provided a method for manufacturing a wet friction member comprising the steps of: forming a paper-made substrate by mixing pulverized corks, impregnating the paper-made substrate formed by mixing the pulverized corks with a synthetic resin to be a binder, then heating and curing it.

Here, pulverization of the cork is an action for making more surface area thereof. The experiments by the inventors show that it is preferable to use cork particles/powders having a particle diameter (median diameter) within a range of 3 μm to 200 μm.

With the manufacturing method of the wet friction member, the cork itself has a high friction coefficient μ. Moreover, the cork in a powder shape increases surface area and an area in contact with a counter member. In addition, the cork itself has suitable or appropriate flexibility, thereby improving adhesiveness between a surface of the wet friction member and a separator plate. Thus, the wet friction member is capable of improving or increasing a friction coefficient μ of a friction surface, decreasing weight by reducing the number of friction members, and achieving a high efficiency.

Accordingly, it is possible to satisfy the demand for reduction in fuel consumption based on weight saving and reduction in the number of wet friction members, thereby fulfilling the social needs such as the needs of automobile manufacturers and customers.

According to a fourth aspect of the invention, there is provided a method for manufacturing a wet friction member having additional features to the first aspect of the invention. The method further comprises steps of: applying heat treatment to the pulverized cork powders/particles for improving a discharge capacity of an oil film between a surface of the wet friction member and a separator plate, and papermaking a paper-made substrate from the pulverized cork powders/particles.

Then, water or the like in the cork is volatilized by heating a surface of the cork subjected to the pulverization. Consequently, a capacity of the wet friction member for absorbing and discharging oil is further improved. Thereby, the discharge capacity of the oil film between the surface of the wet friction member and the separator plate is improved. Thus, further effects are obtained by heating the pulverized cork, in addition to the effects of the third aspect of the invention.

BRIEF DESCRIPTION OF THE SEVERAL VIEWS OF THE DRAWINGS

FIG. 1A and FIG. 1B are graphs showing measurement results of a penetration time of an oil and a friction coefficient in each of first to sixth examples of wet friction member (as working examples) of a preferred embodiment of the invention and a comparative example of wet friction member, respectively.

DETAILED DESCRIPTION OF THE INVENTION

A wet friction member according to a preferred embodiment of the invention is hereunder described.

In the embodiment, numeric values described in the same column of TABLE indicate a magnitude of the numeric values and, since the material described hereafter is still basically a composition material, a redundant or overlapped description is omitted here.

A wet friction member according to a first embodiment of the invention is described first.

The wet friction member according to the present embodiment is a paper facing that uses a paper-made substrate as its base material. The wet friction member is used as a wet clutch of an AT (automatic transmission), a lock up friction member or the like.

The wet friction member according to the present embodiment is composed of a base fiber such as a pulp and/or an aramid fiber and a filler such as a friction conditioner or friction modifier and an extender pigment. The base fiber and the filler are mixed and formed into a paper-made substrate. The paper-made substrate is impregnated with a phenolic resin which is a thermosetting resin to be a binder and heated and cured or hardened. When the paper-made substrate is formed, an additional cork (cork powders or cork particles or cork grains) having a particle diameter (median diameter) within a range of 3 μm to 200 μm is mixed as a friction conditioner or friction modifier.

According to a definition of Japanese Industrial Standard, i.e. the definition of terms in the body text and the comment of JIS Z 8901 "Test Powders and Test Particles", the "median diameter" is a particle diameter (diameter) in a particle size distribution at which a number (or mass) of powders accounts for 50% of a total number (or mass) of powders (i.e. the diameter where the number or mass of the powders having the same or larger diameter than the median diameter comes up to 50% of the total number or mass). Namely, the median diameter is a particle diameter where the 50% (in number or mass) of the powders or particles or grains exceed the other 50% or the rest of the powders or particles or grains. The median diameter is also generally referred to as a 50% particle diameter and expressed as $D_{50}$. In terms of definition, the size of the particle group is expressed by the average particle diameter and the median diameter. However, the values of the median diameter here are values measured by representation of a product description and by means of a laser diffractometry or a laser scattering method.

The "median diameter measured by means of a laser diffractometry or a laser scattering method" means a particle diameter ($D_{50}$) at which an accumulated weight percent is 50% of a particle size distribution obtained by the laser diffractometry or the laser scattering method using a laser diffusion-type particle size distribution measurement. The above-described numeric values are not an exact value but a crude or approximate value. Naturally, it is an approximate value that includes an error by measurement or the like and it is embraced that such value may include an error of several percent.

As the base fiber according to the present embodiment of the invention, a cellulose fiber (pulp), an aramid fiber or the like is used. In addition, a synthetic fiber including a polyolefin fiber such as polyethylene, polypropylene, and polystyrene, a polyester fiber such as polyethylene terephthalate, polybutylene terephthalate, and a copolymer thereof, an acrylic fiber such as polyacrylonitrile and modacrylic, a polyamide fiber such as nylon 6, nylon 66, and nylon 12, a polyvinyl alcohol fiber, a wholly aromatic polyamide fiber (aramid fiber), a semiaromatic polyamide fiber, a polyvinylidene chloride fiber, a polyvinyl chloride fiber, a polyimide fiber, and an urethane fiber, a semisynthetic fiber including a triacetate fiber and a diacetate fiber, a cellulose fiber including viscose rayon, cuprammonium rayon, and polynosic rayon or a regenerated fiber made by spinning collagen, alginic acid, chitin or the like may be used instead.

A polymer constituting the fiber may be used in the form of a homopolymer, a modified polymer, a blend, a copolymer or the like. It may be used as a conjugate fiber comprising a plurality of components.

Moreover, a natural fiber which is not pulped such as a kenaf, a bamboo, and a hemp, a glass fiber, a carbon fiber, a metallic fiber, a rock fiber or an oxide fiber such as titania, alumina, and silica may be used instead. Furthermore, a combination of two or more of these fibers or a composite fiber composed of two or more of these fibers may be used instead.

As the base fiber according to the present embodiment of the invention, a wholly aromatic polyamide fiber, an acrylic fiber or a cellulose fiber is especially preferable among the above-described fibers from the viewpoint of heat resistance and high strength. Particularly, the wholly aromatic polyamide fiber is more preferable from the viewpoint of heat resistance. As the wholly aromatic polyamide fiber, a para-oriented wholly polyamide fiber is especially preferable.

These fibers generally have an average length of around 0.5 mm to 5 mm. The fibers having a fiber diameter of 0.1 μm to 6 μm is used. As an organic fiber, a fibrillated fiber may be used.

The friction conditioner or modifier according to the present embodiment of the invention includes an inorganic powdered material such as a graphite, a molybdenum disulfide, a barium sulfate, and a silica powder, an organic powdered material such as a cashew dust and a fluororesin powder and a fiber for improving paper strength such as a glass fiber, a carbon fiber, a ceramic fiber, an aramid fiber, and a metallic fiber including a steel or the like. Such a friction conditioner is blended and dispersed in the water and formed into a paper-made substrate of a paper sheet shape by means of a normal conventionally known paper making method.

A thermosetting resin impregnated into the paper-made substrate, which is used as the binder here, not only connects and holds the base fiber and the filler but also greatly affects friction characteristics, abrasion resistance or the like of the wet friction member. Hence, a phenolic resin that is excellent in heat resistance and bonding property (adhesion property), high in mechanical strength, and has comparatively favorable friction characteristics, heat resistance or the like is generally used for the thermosetting resin as the binder.

The phenolic resin is formed by a polycondensation reaction of phenols such as phenol and cresol with aldehydes such as formaldehyde under the influence of an acid catalyst or an alkali catalyst. However, in the wet friction member, a resol-type phenolic resin formed by a polycondensation reaction under the influence of an alkali catalyst is mainly used.

Alternatively, a modified phenol resin may be used as the phenolic resin to be used. For example, a phenolic resin modified with an alkylbenzene-formaldehyde resin formed by a polycondensation reaction of alkylbenzene with formaldehyde is capable of reducing a torque amplitude in a stick-slip which occurs during a low-speed sliding frictional engagement. As another example, a phenolic resin modified with a drying oil such as a tung oil and a linseed oil may be used in some cases. Here, in the present embodiment of the invention, the phenolic resin which is a thermosetting resin impregnated into the paper-made substrate is used as the binder. However, the present invention is not limited thereto. As long as impregnation into the paper-made substrate is possible or achieved, a synthetic resin which is excellent in heat resistance such as a polyimide resin and a polyamideimide resin may be used instead.

The extender pigment in itself according to the present embodiment of the invention does not have a coloring power and a hiding power. The extender pigment is a white pigment that is used as an admixture for diluting or increasing volume of other pigments to improve fluidity, strength or optical property. More specifically, a barium sulfate, a calcium carbonate, an aluminum hydroxide or the like is used as the extender pigment.

As the other fillers, a cashew dust that is a friction conditioner mainly used to improve and stabilize a friction coefficient, a solid lubricant mainly used to improve an abrasion resistance such as a graphite and a molybdenum disulfide and/or an aluminum powder mainly used to improve a friction coefficient and a heat conductivity may be used. A barium sulfate, a calcium carbonate, a magnesium carbonate, a potassium titanate and/or a diatom earth or the like, which are an extender pigment, may be used as the filler. The diatom earth as the extender pigment is especially preferable, since it is porous in itself and has a capacity for absorbing oil. In general, the diatom earth preferably has a diameter of 2 μm to 20 μm, more preferably 4 μm to 6 μm.

In particular, as the filler according to the present embodiment of the invention, the cork pulverized to have a particle diameter (median diameter) within a range of 3 μm to 200 μm is mixed as a friction conditioner or a friction modifier in the paper-made substrate.

Several corks are available as the cork (filler) for the wet friction member according to the embodiment of the present invention. Specifically, in the present embodiment of the invention, a first to a fifth working examples of wet friction members is filled with corks (first to fifth corks) that are prepared respectively by heating a raw pulverized cork (raw cork powders) to obtain heated cork powders or grains. Moreover, a sixth working example of wet friction material is filled with a cork (sixth cork) that is prepared without any heating process to obtain non-heated cork powders or grains. In the first to the fourth example of wet friction members, the corks (first to fourth corks) were prepared by a heating process under a condition of a heating time (duration of heating) of 30 minutes, while a heating temperature is set at one of 140° C., 150° C., 180° C. or 200° C., respectively. Moreover, even when the heating temperature is set at the same 200° C., the heating temperature may be set longer than 30 minutes. That is, in the fifth example of wet friction member, the cork (fifth cork) was prepared by a heating process under a condition of a heating time of 90 minutes even thought the temperature was set at 200° C. In addition, a comparative example of wet friction member was prepared without mixing any cork therein.

Next, a papermaking method of the paper-made substrate according to the present embodiment of the invention is described.

The paper-made substrate used in the wet friction member of the present invention can be made from a base fiber and a filler by means of a commonly-used papermaking method.

The wet friction member according to the present embodiment contains 40% by weight of a base fiber such as pulp and an aramid fiber and 60% by weight of a filler. The wet friction material may contain, as the filler, 40% by weight of a friction conditioner or a friction modifier, and 20% by weight of an extender pigment. The friction conditioner or modifier contains 15% by weight of the cork having a particle size (median diameter) of 3 μm to 200 μm. The base fiber and the filler are made into a cloudy or turbid state and dispersed in water to form a slurry. The slurry is fixed or flocculated by a fixing agent or a flocculant including an aluminum sulfate or the like. These materials are formed into a sheet-like paper having a predetermined thickness by use of a Fourdrinier paper machine or a cylinder paper machine. The paper in a wet state is dried to complete the papermaking process or to obtain a paper-made substrate used in the wet friction member of the present invention. In the present embodiment, it is described that the cork is pulverized to have a particle diameter (median diameter) within a range of 3 μm to 200 μm and that such cork is added in an amount of 15% by weight in the wet friction member (as a typical diameter range and a typical additive amount). However, at least the additive amount of the cork may be changed as long as it keeps its aimed functions and effects for the inventive wet friction member. That is, the inventors confirmed through experiments that the cork can be used in an additive amount of 10% to 40%. The paper-made substrate thus prepared is formed into a predetermined shape by means of punching or the like and thereafter impregnated with a synthetic resin as a binder. Alternatively, the paper-made substrate thus prepared is impregnated with a synthetic resin as a binder and thereafter formed into a predetermined shape by means of punching or the like to produce a wet friction member of the present invention.

A penetration time of oil and a friction coefficient μ were measured on the first to the sixth working examples according to the present embodiment of the invention and a comparative example. For the measurement, a paper-made substrate (according to each of the working examples) was prepared with the pulverized cork mixed and arranged therein by papermaking, while a paper-made substrate (according to the comparative example) was prepared without any pulverized cork mixed and arranged therein by papermaking. Each of the paper bodies was impregnated with a phenolic resin after being punched in a predetermined shape and heated. Each of the cured and hardened paper bodies was used as a friction lining or a friction material.

1. Measurement of Oil Penetration Time:

The measurement of oil penetration time is conducted to measure a time from when a predetermined amount of ATF is dropped on the lining till when the ATF is absorbed therein. An oil absorbing/discharging capacity of the paper-made substrate (used as the inventive wet friction member) according to each of the examples can be specified and determined by an oil absorption capacity of the lining.

The measurement condition was set as follows. That is, a measurement temperature was set at a room temperature. A dropping amount of oil was set at 7 μl (using a microsyringe).

2. Measurement of Friction Coefficient μ (By SAE No. 2 testing machine):

The friction coefficient test is conducted to evaluate friction characteristics between a clutch (friction member) and a lubricating oil in accordance with JASO friction characteristics test method for automatic transmission fluid (JASO M348: 2002).

More specifically, the friction member was rotated at a predetermined speed and then an amount of a torque generated when applying a pressure to the friction member (at the time of engagement) was measured to calculate the friction coefficient μ.

The measurement condition was as follows.

A size of a friction member: Φ135×Φ107
Rotation: 3600 rpm
Surface pressure: 0.8 MPa
Oil temperature: 100° C.
Amount of oil: Full Dipped A heating condition of each of the first to the sixth examples of paper-made substrates having the pulverized cork mixed therein is shown in TABLE 1.

TABLE 1

|  | First Example | Second Example | Third Example | Fourth Example | Fifth Example | Sixth Example |
| --- | --- | --- | --- | --- | --- | --- |
| Heating Temperature (° C.) | 140 | 150 | 180 | 200 | 200 | 0 |
| Heating Time (min) | 30 | 30 | 30 | 30 | 90 | 0 |

As shown in FIG. 1, the first, second, and sixth examples of the paper-made substrates have a longer oil penetration time as compared with the comparative example of paper-made substrate in the measurement of oil penetration time. However, the first, second, and sixth examples of the paper bodies show a higher friction coefficient μ as compared with the comparative example of paper-made substrate (having no cork contained and arranged therein) in the measurement of friction coefficient μ.

The test results of the sixth example and the comparative example will teach a reason why the high friction coefficient μ of the paper-made substrate (used as the inventive wet friction member) shown in FIG. 1 is obtained. That is, the test results of the sixth example and the comparative example show or suggest that a physical property of a friction surface of the wet friction member is modified by a friction coefficient of the pulverized cork and that the hardness of the wet friction member is softened by a flexibility of the cork itself to improve an adhesion to a counter member. Thereby, the high friction coefficient μ was probably obtained. Moreover, it is found from the test results of the first, second, and sixth examples that the friction coefficient varies depending on the heat treatment to the pulverized cork. It leads to or suggests the fact that the friction coefficient of the cork varied by the heat treatment. Thus, the heat treatment is taken as a means for improving the friction coefficient of the cork itself.

It is guessed that the oil penetration time is affected by the water or the like contained in the pulverized cork. That is, the water or the like is contained or absorbed in the cork, so that the cork itself has a hydrophilic property. Thereby, the absorption of the oil into the cork is probably suppressed. In order to improve the capacity for absorbing the oil, the cork is subjected to the heat treatment. The heat treatment is performed under a predetermined heating condition. That is, the heating time is set at a predetermined time period within a range from relatively a shorter time to relatively a longer time (preferably within a time range from 30 minutes to 90 minutes as shown in TABLE 1). In the embodiment of the wet friction member, the heating time was set at 30 minutes in the first to the fourth embodiments and at 90 minutes in the fifth embodiment. The heating temperature is set at a predetermined temperature within a range from relatively a lower temperature to relatively a higher temperature (preferably within a temperature range from 140° C. to 200° C. as shown in TABLE 1). In the embodiment of the wet friction member, the heating temperature was set at 140° C. (first example), 150° C. (second example), 180° C. (third example) and 200° C. (fourth and fifth examples). In case the heating treatment is performed at a time of 30 minutes and at a heating temperature of 140° C. (condition of the first example) or at a heating temperature of 150° C. (condition of the second example), there is no remarkable effect confirmed on the oil penetration capability. However, in case the heating treatment is performed at a time of 30 minutes and at a heating temperature of 180° C. or more (conditions of the third and the fourth examples), a shorter penetration time of oil was obtained as well confirmed from the results of FIG. 1. Moreover, in case the heating treatment was performed at a heating temperature of 200° C. (highest temperature) for 90 minutes (longest time), a much shorter penetration time (or shortest oil penetration time) was obtained as shown in FIG. 1. From these results, it is guessed that the water or the like contained in the cork is not sufficiently removed or eliminated at 140° C. (condition of the first example) or 150° C. (condition of the second example) and that the cork still has poor affinity to the oil, thereby failing to improve the permeability of the oil into the paper-made substrate. However, in case the heating treatment is performed at 180° C. or more (conditions of the third and fourth examples), it is guessed that the water or the like contained in the cork is removed and eliminated to a large degree or substantially completely by the heating at the higher temperature. Such elimination of water or the like from the fork will help the oil to penetrate into the cork easily. In addition, as the condition of the heat treatment, if the heating temperature is higher and the heating time is longer, namely if the condition is set such that the water or the like is easily discharged from the cork by evaporation or by resolution or decomposition in some cases, the oil can easily penetrate into the cork. As a result, an amount of the oil present on the friction surface of the wet friction member and on the counter member can be reduced such that an oil film is substantially gone or eliminated, thereby improving the friction coefficient μ in the first to the sixth examples of paper-made substrate or wet friction member. Thus, according to the present embodiment, the oil amount between the friction surface of the wet friction member and the counter member can be adjusted and controlled by changing or adjusting an amount of the cork blended in the wet friction member, a particle diameter of the cork and the heating condition of the cork within a preferable range. Thus, the friction coefficient μ necessary for achieving a required performance is easily assured in the present embodiment of the wet friction member.

As described above, the flexibility and the friction coefficient of the friction surface of the wet friction member can be modified and improved by blending and arranging the cork powders in the wet friction member, while pulverizing the corks into powders or grains of a desirable particle diameter. It improves the friction coefficient of the friction surface of the wet friction member first. Moreover, the friction coefficient of the cork itself is improved by applying a heat treatment to the cork of the desirable particle diameter. In particular, the affinity of the cork to the oil is improved by discharging and removing the water or the like contained in the cork. That is, the cork changes from being hydrophilic to being lipophilic by the heat treatment, so that the permeability of the oil into the cork is improved. Thus, the wet friction member of the present embodiment is capable of controlling and improving the friction coefficient, which will decrease or deteriorate due to the presence of the oil, by the cork powders that absorb the oil between the friction surface of the wet friction member and the counter member. Consequently, the wet friction member can maintain a high friction coefficient. At this time, a correlation is found between the oil absorbing capacities and the oil discharging capacity. That is, a wet friction member having a good absorption capacity has an improved discharge capacity, too. Thus, it is concluded that the cork having an improved oil absorbing capacity by the heat treatment has an improved oil discharge capacity in the same manner.

Any condition may be selected for the heat treatment as long as the water or the like contained in the cork is removed or eliminated under such condition. Still, the inventors found from the experiments that where the cork was heated at a temperature less than 140° C., a prolonged heating was required and productivity was low. On the other hand, the inventors found that even though the cork was heated at a temperature more than 200° C., the difference in the effect for eliminating the water or the like was small in comparison with the temperature range of 140° C. to 200° C. Moreover, it was found that it was preferable to set the heating temperature of the cork powders within a range of 150° C. to 200° C. in consideration of a property modification effect or reforming effect on the friction coefficient of the cork.

The inventors also confirmed from the experiments that the heating treatment was applied to the cork was regardless of the atmospheric condition, i.e. whether it was performed in the atmosphere (normal air condition), in a gas atmosphere such as a nitrogen atmosphere or in a non-oxygen atmosphere. The duration of heating treatment is preferably within a range of 30 minutes to 90 minutes. In such range, the finishing quality of the wet friction member does not vary and a stable quality is obtained. Thus, it is preferable to control the heating temperature within such range.

It is beyond doubt that the heating treatment of the cork powders depends on or is specified by a magnitude of an integral value of the heating temperature and the heating time when the cork is heated. The product of the both values (integral value) is preferably set within a range of 4500° C.·min to 18000° C.·min. It is also beyond doubt that the integral value varies depending on a particle diameter.

As described above, the wet friction member according to the present embodiment contains the cork that is pulverized into a particle diameter (median diameter) within a range of 3 μm to 200 μm. The cork subjected to the pulverization (i.e. cork powders) is heated to the temperature of 150° C. to 200° C. if necessary. The pulverized cork is mixed with other papermaking materials of the wet friction member. These papermaking materials are formed into a paper-made substrate. The paper-made substrate is impregnated with a synthetic resin such as a modified phenolic resin and heated and cured.

Thus, the cork itself has a high friction coefficient μ. Moreover, the cork has an increased surface area in itself since it is used as a powdery substance. Consequently, the cork powders contained in the wet friction member enlarges a total area of the wet friction member that comes in contact with a separator plate. Thereby, the friction coefficient of the friction surface of the wet friction member is improved. Moreover, the friction coefficient of the cork itself and the capacities of the cork for absorbing and discharging the oil are improved by heating the cork. Thus, there is provided a wet friction member that has a higher friction coefficient μ. In particular, in case the present invention is applied to a wet friction member such as a wet clutch or a lock up friction member, it is possible to increase the friction coefficient μ, to achieve a weight reduction by reducing the number of the friction members and to attain a high efficiency. Accordingly, the wet friction member according to the invention is capable of fulfilling the demand for reduction in fuel consumption based on weight reduction and the reduction in the number of wet friction members and to satisfy the social needs such as the needs of an automobile manufacturers and consumers.

The wet friction member according to the present embodiment contains the cork powders that are modified by the heating treatment to have an improved friction coefficient. The water or the like in the cork is volatilized by the heating treatment, thereby improving the affinity to the oil and the capacities for absorbing and discharging the oil. Thus, a high friction coefficient required in the wet friction member is easily assured. The wet friction member especially exhibits a μ-V characteristic of positive gradient and has a favorable characteristic.

Though the invention is described on the wet friction member in the above-described embodiment, the invention can be conceived as a method for manufacturing the wet friction member, too. The method for producing the wet friction member comprises the steps of: pulverizing a cork to have a particle diameter (median diameter) within a range of 3 μm to 200 μm, heating the pulverized cork (cork powders) to a temperature of 150° C. to 200° C. if necessary, mixing the pulverized cork with other papermaking materials of the wet friction member to form a paper-made substrate, impregnating the paper-made substrate with a synthetic resin as a binder such as a modified phenolic resin, and then heating and curing.

Thus, the cork itself has a high friction coefficient or a higher friction coefficient μ by the heat treatment. Moreover, a powder thereof having a particle diameter (median diameter) within a range of 3 μm to 200 μm increases its surface area. In addition, the cork has flexibility, thereby producing more area that comes in contact with a plate of a counter member. Thereby, the wet friction member has an improved friction coefficient μ. Furthermore, the capacities for absorbing and discharging the oil into the cork are improved by heating the cork. Consequently, a reduction in the friction coefficient due to the presence of the oil between the friction surface and the counter member is suppressed and a high friction coefficient is maintained. Thus, weight reduction by reducing the number of the wet friction members and the high efficiency can be achieved.

Accordingly, it is possible to fulfill the demand for reduction in fuel consumption based on weight reduction and the reduction in the number of wet friction members and to satisfy the social needs such as the needs of automobile manufacturers or consumers.

In the method for producing the wet friction member, the cork powder has an improved friction coefficient by the heating treatment up to a temperature of 150° C. to 200° C. Moreover, the water or the like in the cork is volatilized and the cork powder has improved capacities for absorbing and discharging the oil. Thus, in a papermaking process of the wet friction member, when the cork powder is blended with other papermaking materials to form a paper-made substrate, a high friction coefficient required in the wet friction member is easily assured.

The volatilization of the water or the like in the cork can be achieved with a dehumidifying agent such as silica gel and quick lime instead. However, the wet friction member can be produced at a lower cost by means of heating the cork powder to a temperature of 150° C. to 200° C.

The preferred embodiments described herein are illustrative and not restrictive, the scope of the invention being indicated in the appended claims and all variations which come within the meaning of the claims are intended to be embraced therein.

The invention claimed is:

1. A wet friction member, comprising:
a paper-made substrate made from base fibers and a pulverized cork mixed with the base fibers, and
a synthetic resin as a binder impregnated and heated to be hardened in the paper-made substrate,
wherein the pulverized cork comprises a heated pulverized cork that was subjected to a heat treatment for improving a discharge capacity of an oil film between a surface of the wet friction member and a separator plate as a counter member.

2. A wet friction member according to claim 1, in which the pulverized cork has a median diameter within a range of 3 μm to 200 μm.

3. A wet friction member according to claim 1, in which the heated pulverized cork was heated at a heating temperature within a range of 140° C. to 200° C.

4. A wet friction member according to claim 1, in which the paper-made substrate contains the pulverized cork in an amount of 10% to 40% by weight.

5. A method for manufacturing a wet friction member, comprising the following steps in the order listed:
heating a pulverized cork,
forming a paper-made substrate by a paper making method, while mixing the pulverized cork with base fibers,
impregnating the paper-made substrate containing the pulverized cork therein with a synthetic resin as a binder, and
heating and hardening the synthetic resin in the paper-made substrate, wherein the pulverized cork is heated for improving a discharge capacity of an oil film between a surface of the wet friction member and a separator plate as a counter member.

6. A method for producing a wet friction member according to claim 5, in which the pulverized cork heating step comprises a step, before the paper-made substrate forming step, of heating the pulverized cork at a heating time within a range of 30 minutes to 90 minutes and at a heating temperature within a range of 140° C. to 200° C.

* * * * *